US006571218B1

(12) United States Patent
Sadler

(10) Patent No.: US 6,571,218 B1
(45) Date of Patent: *May 27, 2003

(54) REMOTE APPROVAL SYSTEM AND METHODS FOR USE IN NETWORK OF RETAIL CHECKOUT TERMINALS

(75) Inventor: Robert F. Sadler, Cumming, GA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/291,708

(22) Filed: Apr. 14, 1999

(51) Int. Cl.[7] .............................................. G06F 17/60
(52) U.S. Cl. ...................... 705/16; 705/21; 235/462; 235/467
(58) Field of Search ................. 705/1, 15, 16, 705/23–26, 17; 235/462, 467

(56) References Cited

U.S. PATENT DOCUMENTS 5,937,386 A * 8/1999 Frantz ........................ 705/23
6,032,128 A * 2/2000 Morrison et al. ............ 705/23
6,167,381 A * 12/2000 Swaine et al. ............... 705/17

FOREIGN PATENT DOCUMENTS

JP        55-119772       *  9/1980  ................. 705/23

OTHER PUBLICATIONS http://www.pscnet.com/uscanspe.htm, 1998. (A copy of this reference has been provided in SN 09/340,523.*
http://www.pscnet.com/html/self–checkout.htm.*

* cited by examiner

Primary Examiner—Richard Chilcot
(74) Attorney, Agent, or Firm—Priest & Goldstein, PLLC

(57) ABSTRACT

In a system for processing store interventions in a network of self-checkout terminals, self-checkout terminals monitor the self-checkout activities performed to determine whether an issue has arisen requiring intervention by store personnel. Detected issues are prioritized and placed into an issues log. A remote authorization station connected into the network accesses the issues log to review and resolve the issues that have arisen in priority order. Further, where it is determined that an issue has arisen at a self-checkout terminal that cannot be resolved at that terminal, the transaction is suspended and then resumed at a personnel-operated terminal.

18 Claims, 14 Drawing Sheets

REMOTE APPROVAL SYSTEM AND METHODS FOR USE IN NETWORK OF RETAIL CHECKOUT TERMINALS

BACKGROUND OF THE INVENTION

1. Field of the Invention

The present invention relates generally to improvements to retail checkout systems, and more particularly to advantageous aspects of a system and methods for facilitating remote approval of transactions occurring at retail checkout terminals.

2. Description of the Prior Art

The retail checkout process at a cashier-operated checkout terminal includes many stages, including the scanning and identification of items to be purchased, and the tendering of payment by the retail customer. Many of these stages can require approval by a supervisor. The reasons for approval are varied, but can involve price-required items, discounts, voids, and/or transaction cancellations. Typically, in these situations, the transaction is halted as the cashier summons a supervisor, who analyzes the situation, performs any needed action, and then allows the transaction to continue.

The need for approval by a supervisor presents difficulties in implementing a self-checkout environment, in which the checkout function is performed not by a cashier, but rather by the retail customer. In addition to the above-described situations, the self-checkout environment may include new situations requiring approval by a store supervisor. These situations can involve transaction types that the store prefers not to conduct at the self-checkout lane itself, plus items or issues relating to security, device errors, or even requests for help.

Certain current self-checkout systems require the retail customer to summon a store employee to the self-checkout terminal when an approval situation arises. The employee then operates the local machine directly to expedite the situation. However, this scenario is practical only when there are a small number of self-checkout lanes in close proximity to each other. When there are a larger number of lanes and/or they are not physically close to each other, the approval function becomes hard to handle efficiently and quickly with direct manual intervention.

One current self-checkout system allows a store employee to perform the approval function remotely, but in that system, each situation is handled at the time the issue is created. In addition, that implementation does not distinguish between "ordinary" approvals that can be handled using the store's current methods and "self-checkout" items that are peculiar to the self-checkout environment. This remote approach leads to complexities in the system software, as the algorithms needed to control the store's general business are commingled with the algorithms needed to address self-checkout issues.

These and other issues are addressed by the invention described herein.

SUMMARY OF THE INVENTION

A first embodiment of the present invention provides a system for processing store interventions in a network of self-checkout terminals. Each self-checkout terminal monitors the self-checkout activities performed at that terminal to determine whether an issue has arisen requiring intervention by store personnel and places each such detected issue into an issues log in order of priority. A remote authorization station connected into the network accesses the issues log to review and resolve the issues that have arisen in priority order. Further, where it is determined that an issue has arisen at a self-checkout terminal that cannot be resolved at that terminal, the transaction is suspended and then resumed at a personnel-operated terminal.

Additional features and advantages of the present invention will become apparent by reference to the following detailed description and accompanying drawings.

DETAILED DESCRIPTION

Figure 1:
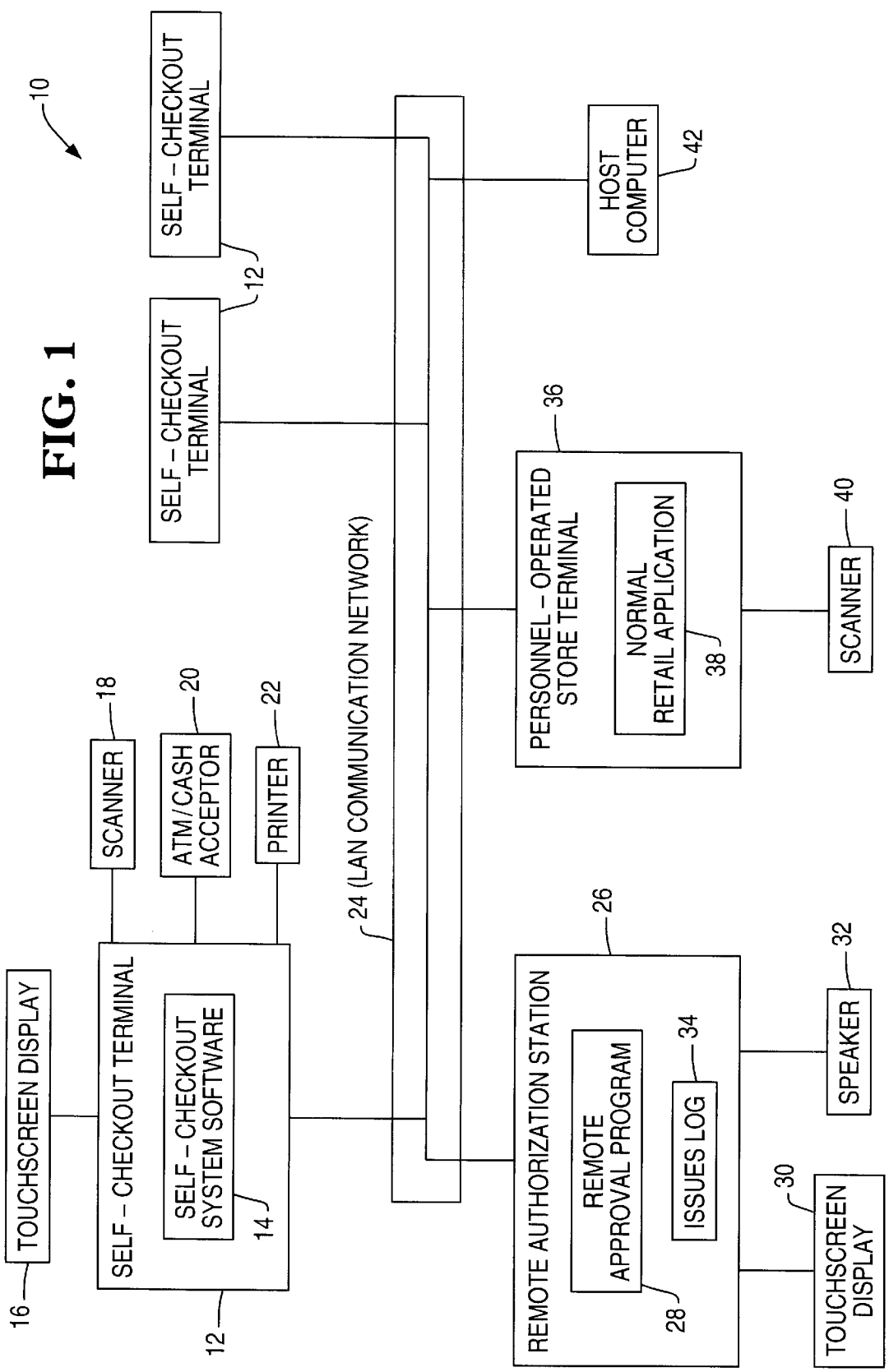
FIG. 1 shows a diagram of a self-checkout system according to the present invention.

It is increasingly common for a retail establishment to provide self-checkout terminals. Self-checkout stations have been used for a number of years, for example, to purchase gasoline. The self-checkout concept has more recently been expanded to include other retail items, such as groceries.

Although self-checkout stations are designed to operate solely based upon inputs provided by the retail customer, there nonetheless arise various situations requiring intervention by store personnel. These situations include the following exemplary situations that may require intervention:

purchase of age-restricted items;
identity verification;
purchase of time-restricted items;
security system violations;
purchase of items for which a price is required;
purchase of items not on file;
"over limit" and off-line electronic payment situations;
system alerts due to device and system failures;
exceeding coupon/item ratios checks;
voiding items;
changing prices;
providing discounts;
canceling a transaction;
use of payment methods not supported, due to types of tender; and
transactions requiring special reimbursement to the customer.

While the above list is representative of typical intervention situations, it is not intended to be all-inclusive, and it will be recognized that the present invention is applicable to other intervention situations which do or may arise.

The present invention provides two basic methods for handling these interventions. In the first method, a remote terminal is provided that is operated by a store supervisor. As issues arise at a self-checkout terminal, the issue is placed into a queue and sent through a network to the store supervisor at the remote terminal for processing. However, the self-checkout terminal remains active. Thus, the customer can continue to perform any further self-checkout functions, as required, while the issue that has arisen is being processed in parallel by the store supervisor at the remote terminal.

In the second method according to the invention, if a certain situation or situations arise that cannot be handled by the remote terminal, the transaction is suspended at the self-checkout terminal, and the retail customer is transferred to another station, attended by a store employee, for completion of the transaction. In this scenario, once the transaction has been suspended at the self-checkout terminal, that terminal is immediately freed up for use by the next customer waiting to use a self-checkout terminal.

The present invention overcomes a number of disadvantages presented by prior-art systems. First, the present system allows the remote approval of multiple lanes in disparate locations by a single store employee. Second, the present system sends all requests for required approvals to a remote operator as they arise, so that they can be processed by the remote operator in parallel with the customer's processing of additional transactions at the self-checkout terminal. Third, the present system advantageously separates the approvals that result from the nature of self-checkout from the items the store's normal application software is already programmed to handle.

FIG. 1 shows a diagram of a system 10 in accordance with a first embodiment of the present invention. As shown in FIG. 1, this embodiment includes a network of self-checkout terminals 12 running self-checkout system software 14. Each self-checkout terminal 12 includes a touchscreen display 16 for providing outputs to and receiving inputs from a retail customer, a scanner 18 for scanning retail items to be purchased by the customer, an ATM/cash acceptor 20 for receiving tenders of payment from the customer, and a printer 22 for printing receipts, including bar-coded receipts for use in suspended transactions, as described below.

The self-checkout terminals 12 are connected to each other by means of a local area network (LAN) 24, such as an Ethernet connection. Also connected into the network is a remote authorization station 26, running a remote approval program (RAP) 28. In the present embodiment, the remote approval station includes a Windows-based PC. The communication between the RAP program 28 and the self-checkout software 14 is implemented using Microsoft's Distributed Component Object Model (DCOM) and ActiveX technologies.

The remote authorization station 16 includes a touchscreen display 30 for providing outputs to and receiving inputs from store personnel, and a speaker 32 for providing audio outputs to store personnel. The remote authorization station 26 further includes an issues log 34 for storing issues arising at the self-checkout terminals 12, as described below.

The system 10 further includes a personnel-operated store terminal 36 that runs the retail store's normal retail checkout application 38. As described below, this terminal 36 is used to complete transactions that have been suspended at a self-checkout terminal 12. The store terminal 36 allows special payment and tendering transactions to be performed outside of the self-checkout system, in the manner in which they are normally handled at the store's other cashier-operated checkout stations. The store terminal 36 includes a scanner that, as described below, is used to scan a bar-coded receipt printed at a self-checkout terminal 12 in order to resume a suspended transaction. The network of terminals is administered by a host computer 42.

Figure 2:
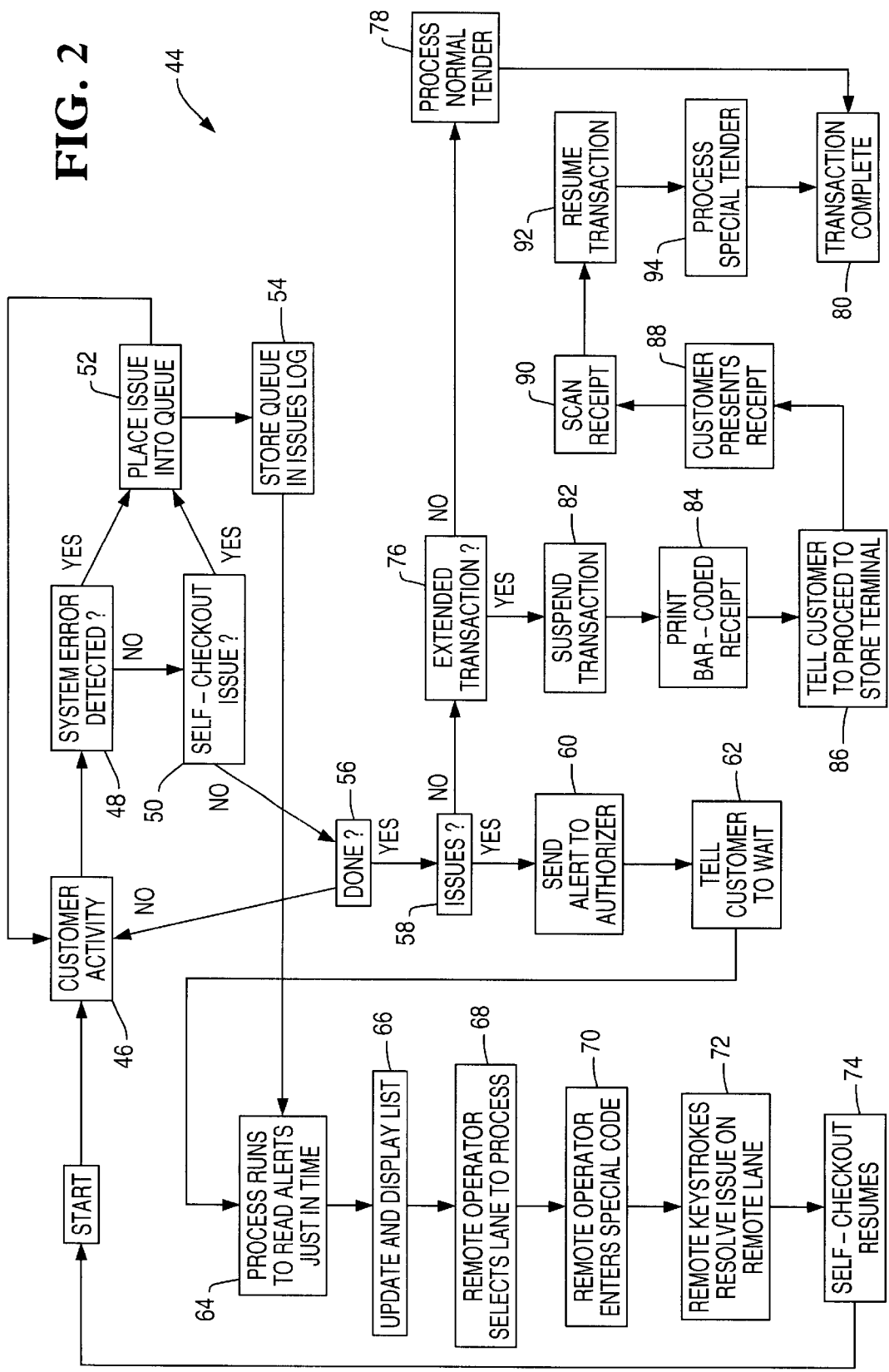
FIG. 2 shows a flowchart of a method according to the present invention for processing interventions by store personnel in a network of self-checkout terminals.

FIG. 2 shows a flowchart of a method 44 according to the present invention for providing store approvals for a network of self-checkout terminals 12. The process starts in step 46 with a customer engaging in checkout activity at a self-checkout terminal 12. In steps 48 and 50, the system determines, respectively, whether any system errors or self-checkout issues have occurred. Any errors or issues are placed into a queue in step 52, and in step 54 are prioritized and then saved in priority order in an issues log 34. In step 56, the system determines whether an event has occurred indicating that the transaction is done. This event would usually be a tender or a critical device error. Once the system has determined in step 56 that the transaction is done, the system determines in step 58 whether any issues have arisen during the self-checkout process that require intervention by store personnel. If so, those issues are addressed in steps 60–74.

In step 60, if issues have arisen after the transaction is done, an alert is sent to the RAP program 28 at the remote authorization station 26. In step 56, the self-checkout software 14 hides the current transaction at the self-checkout terminal 12 with a popup window at the self-checkout terminal display 16 that instructs the customer to wait for the store intervention to be completed. As indicated in step 64, the intervention process runs to read alerts just in time. In other words, the reading of alerts is timed so as to allow issues arising at multiple self-checkout terminals to be resolved in an orderly fashion, while minimizing the waiting time for a retail customer at any of the self-checkout terminals. For example, as described below, a system error occurring in one lane might take priority over an "age-restricted item" issue arising in another lane.

In step 66, the authorizer software updates and shows a list at the display 30 at the remote authorization station 26. In step 68, the operator selects a lane at which interventions are to be processed. As a security measure, in step 70, the remote operator enters a special access code before performing the intervention. In step 72, the authorizer software is able to process the operator's keystrokes at the remote station 26 and send them to the self-checkout lane 12. This protocol lets the operator actually run the software as if the operator were physically at the self-checkout lane at which the intervention is taking place. Thus, the operator sees on his or her remote screen 30 the information that would be seen if the operator were at the self-checkout terminal 12. Therefore, the operator is able to use the self-checkout software 14 to complete the intervention. At the end of the required process, in step 74, control is returned to the customer, and the self-checkout function continues at the self-checkout terminal 12.

If the system determines in step 58 that there are no remaining issues that can be resolved at the self-checkout terminal, then in step 76 the system turns to the question of whether the transaction must be completed at a cashier-operated station in a so-called "extended transaction." If it is determined in step 76 that the transaction can be completed at the self-checkout terminal, then in step 78, the system processes a normal tender, and then the transaction is completed in step 80.

If, however, it is determined in step 76 that an extended transaction is required, i.e., that the customer is attempting to perform a transaction or tender that is not supported by the self-checkout terminal 12, then in step 82, the self-checkout transaction is suspended at the self-checkout terminal 12. In step 84, the self-checkout terminal 12 prints a special bar-coded receipt using its attached printer 22. In step 86, the customer is instructed to take the receipt to a cashier-operated store terminal 36 for further processing. This terminal 36 could be located proximate to the remote authorization station 26 or it could simply be another store lane attended by a cashier or other store employee.

When the customer presents the second terminal with the bar-coded receipt in step 88, the receipt is scanned in step 90 using the scanner 40 attached to the personnel-operated store terminal 36. In step 92, the decoded bar code data is utilized by the store's normal retail application 38 to resume the transaction that was suspended at the self-checkout terminal 12. In step 94, the customer is then free to tender with a check, food stamps, coupons, or any other tender that is not deemed suitable for the self-checkout terminal 12.

At the point that the transaction at the self-checkout terminal is suspended in step 82, the self-checkout terminal 12 is freed for the next customer, as the transaction has been suspended throughout the system. This improves throughput, as the lane is not idle waiting for the previous customer to complete the tender at another station.

In a further embodiment of the invention, certain approvals can be automatically processed by the RAP program 28 while the customer is performing other transaction-related activities at the self-checkout terminal 12. In this case, the RAP program automatically provides information to the self-checkout software needed to complete the transaction. Thus, the customer will not have to wait for these approvals when these transaction-related activities are completed.

For example, customer identification can be used to automatically provide approvals for transactions requiring credit or age verification. The RAP program determines which items need to be processed first among various pending items. The RAP program prioritizes both among the various issues arising at a single self-checkout terminal and among issues arising in transactions taking place at multiple self-checkout terminals. Thus, if a system error has occurred on Lane 1, that might take priority over an "age-restricted item" issue arising on Lane 3.

Figure 3:
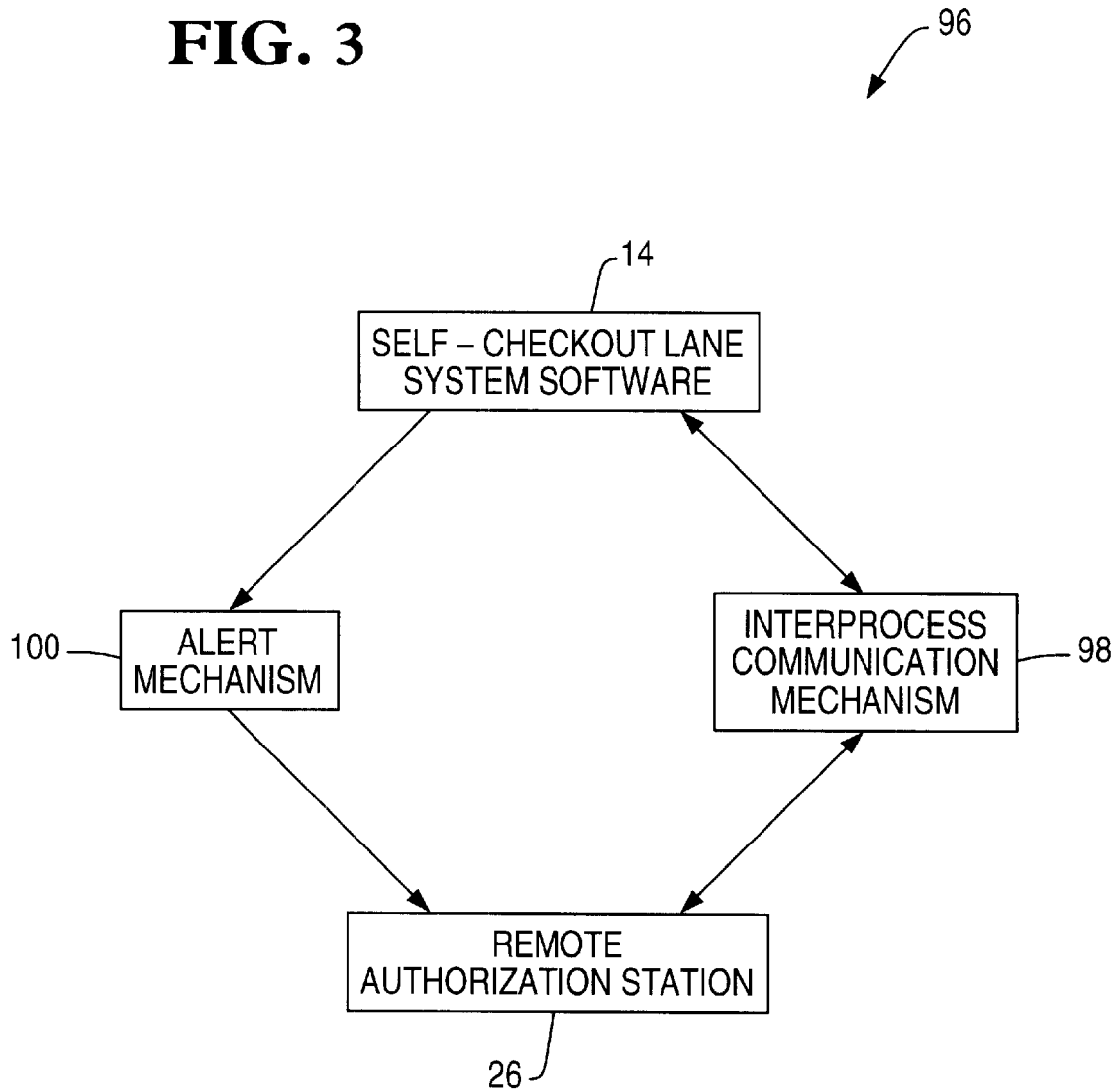
FIG. 3 shows a system according to the present invention for exchanging data between a self-checkout terminal and a remote authorization station.

FIG. 3 shows a diagram of a system 96 for exchanging data between the self-checkout software 14 and the remote authorization station 26. The remote authorization station 26 communicates with the self-checkout software 14 via an interprocess communication (IPC) mechanism 98 (for example, shared memory or named pipes) to change data structures internal to the client software application. The remote authorization station 26 can view, by lane, the type of exception and the associated data to validate or supply for that exception.

Thus, the self-checkout lane system software 14 monitors customer activity to determine when intervention by store personnel is required. When it is determined that intervention is required, the self-checkout lane system software 14 uses the alert mechanism 100 to send an alert to the remote authorization station 26. Data relating to the particular intervention is shared and read by the self-checkout lane system software 14 and the remote authorization station 26 by means of the IPC mechanism 98. The remote authorization station 26 supplies required data fields to the IPC mechanism 98.

FIGS. 4A–4K show screenshots of the touchscreen display 30 which may be advantageously used in conjunction with the remote approval station 26. The RAP program supports the use of bitmap backgrounds, which are provided with the application, but which can be replaced with custom-designed bitmaps. In the presently preferred embodiment, the application is run on a 15-inch touchscreen, with touchscreen buttons. The touchscreen buttons have three states: normal, depressed, and inactive. When a button is touched, its state changes from normal to depressed. When a button is released, its state changes from depressed to normal. When a button option is not available, the button's state is inactive. Audio feedback is provided for all button presses. The text of all instructions and buttons are easily customizable. The screens are designed for 800×600 resolution, using a palette of 16-bit colors.

Figure 4A:
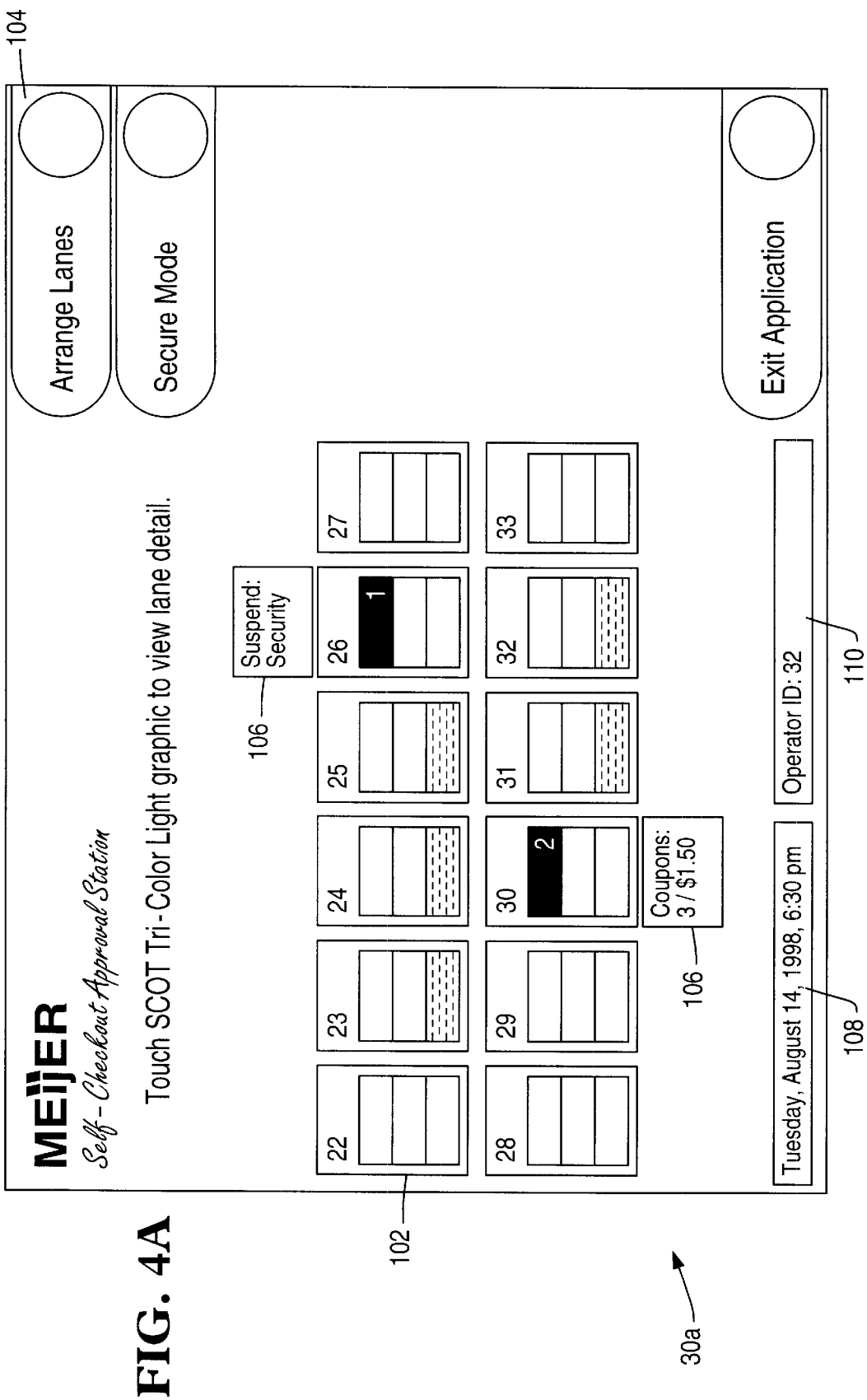
FIGS. 4A–K show screenshots of a display used in conjunction with a remote authorization station according to the present invention.

FIG. 4A shows a screenshot of the main screen 30a of the remote approval program (RAP). In the present embodiment, the RAP program is able to accommodate a maximum of 12 self-checkout lanes, each lane represented by rectangular block graphic 102. The assignment of the 12 lane positions to actual self-checkout lanes is customizable by touching the "Arrange Lanes" button 104, which takes the user to an "Arrange Lanes" screen, discussed below.

If a graphic 102 is not is not assigned to a self-checkout lane, that graphic will not be displayed on the main screen 30a. The lane number is depicted in the upper left corner of each graphic 102. This number is customizable, but is presently limited to three digits. Each graphic 102 includes a tri-color light array, comprising a red top bar, a yellow middle bar, and a green bottom bar. Only one of the three bars is lit at any time the particular self-checkout terminal is active. When a self-checkout terminal is inactive, none of the three bars is lit. The color and position of each bar communicate the status of a particular self-checkout lane. A green bottom light indicates that a self-checkout terminal is in use, and that operation is proceeding normally. A yellow middle light indicates that a self-checkout terminal is in use, and that intervention may soon be necessary. A red top light indicates that intervention is currently necessary. An open lane is depicted as gray, i.e., showing no tri-color light activity. The state of the tri-color light array mirrors a similar tri-color light display appearing on each self-checkout terminal 12.

A numeric priority indicator is depicted for all red lights. The priority is assigned on a first-in, first-out (FIFO) basis. Certain situations arising at a self-checkout terminal requiring subsequent action are flagged by a visual reminder block 106. These situations include, for example, transactions which have been suspended, or transactions requiring coupons to be dropped off at a pay station. This reminder will disappear after a customizable period of time, with a default time, for example, one minute. The reminder for suspended and coupon transactions indicates why the transaction was suspended. These messages may include the following:

Coupons: n/$ x.xx (where n indicates the number of coupons and $ x.xx indicates the total dollar value);

Suspend: Security;

Suspend: Coupons;

Suspend: Restricted;

Suspend: Payment; and

Suspend: Other.

Touching the graphic for a lane will take the user to a "Lane Detail" screen for that lane, described below.

Audio feedback is provided when a lane changes to red-light status. This audio feedback can be muted by the user, if desired.

Figure 4B:
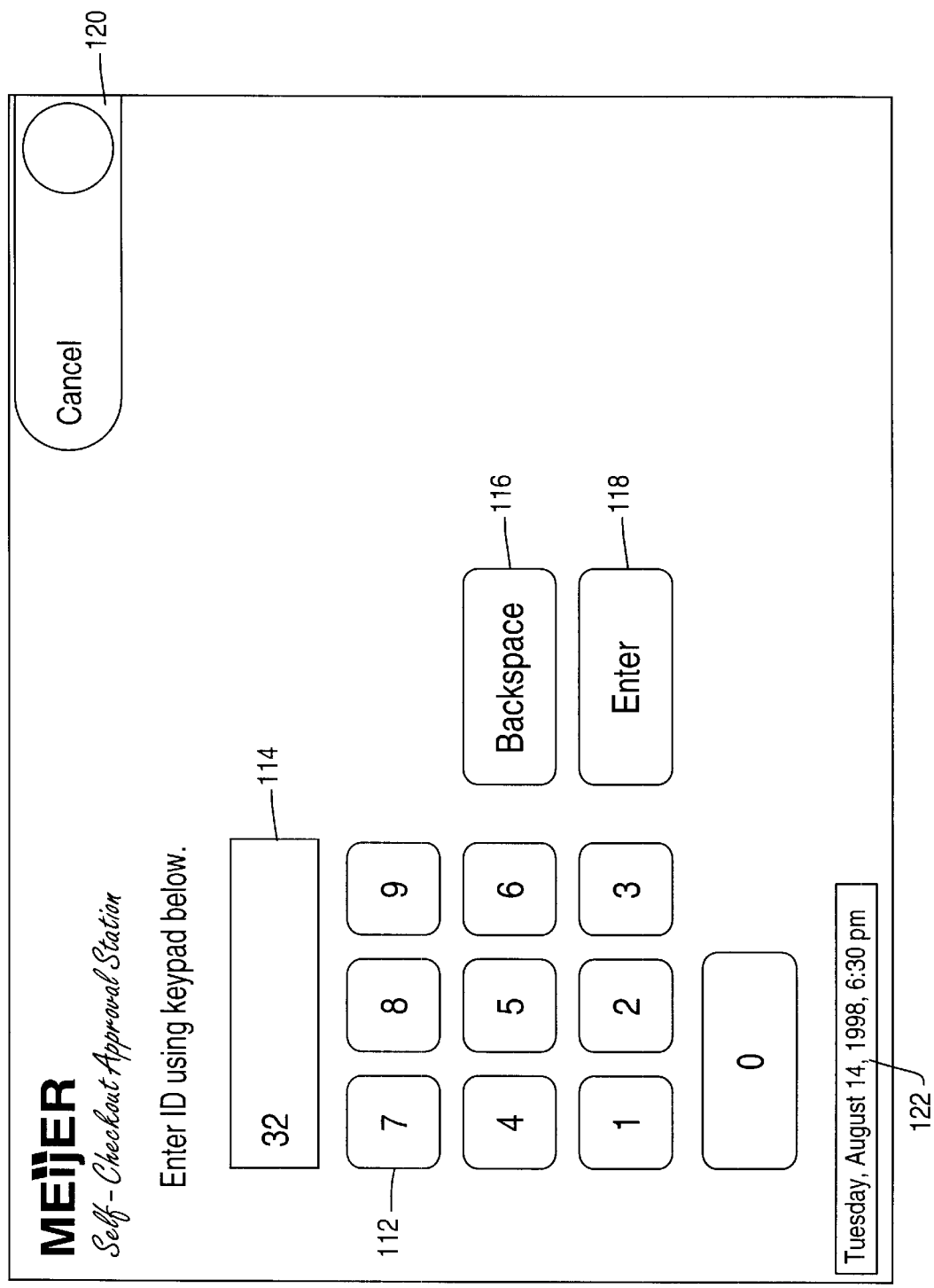
Figure 4C:
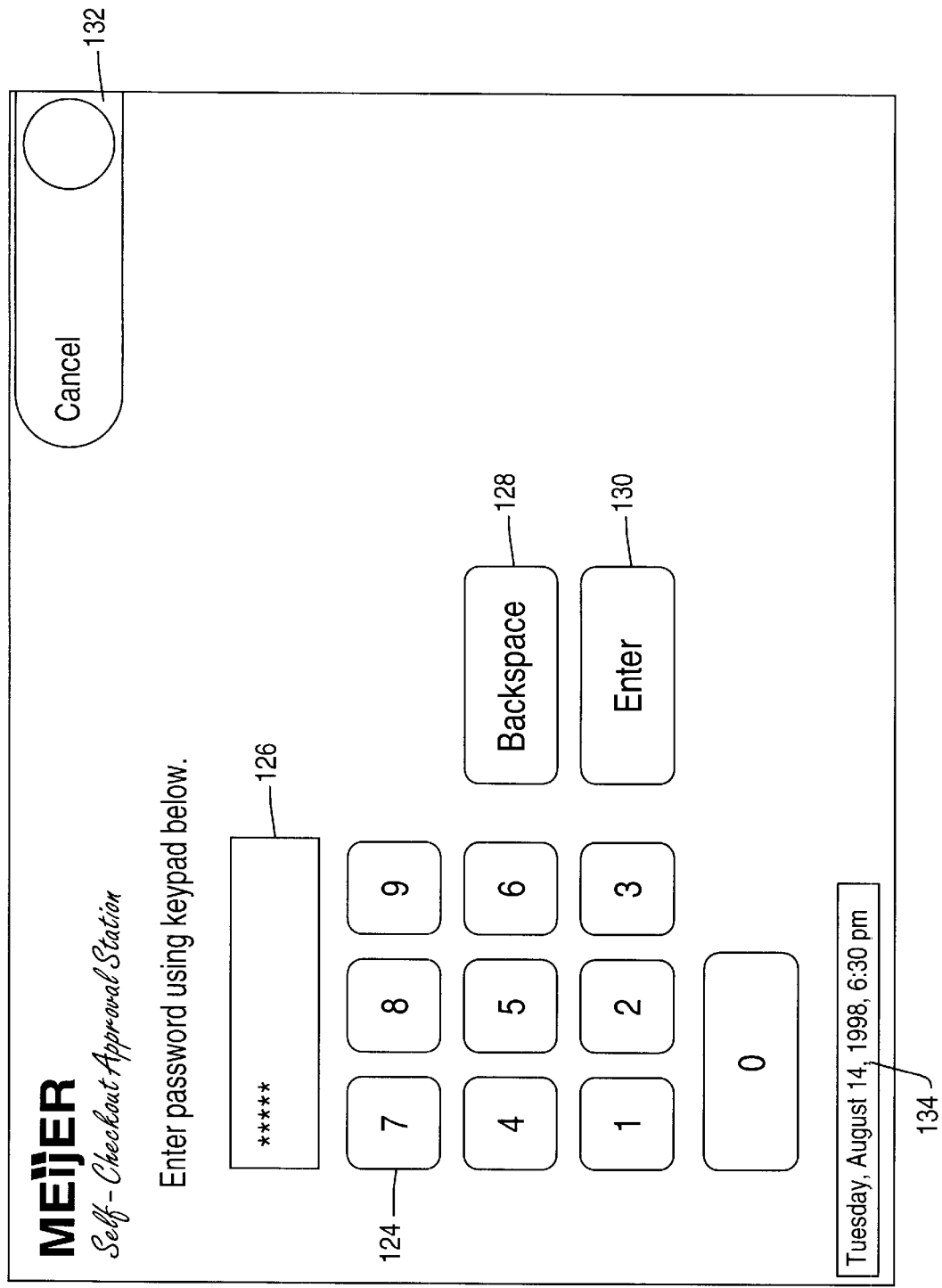

FIGS. 4B and 4C show, respectively, screenshots of an "Enter User ID" screen 30b and an "Enter Password" screen 30c that are used to ensure that the remote approval system is being operated by authorized store personnel. The "Enter User ID" screen 30b is accessed by pressing a "Sign On" button in an introductory screen. After signing on, the date and user information are displayed in blocks 108, 110 at the bottom of the main screen 30a shown in FIG. 4A. User information can be a name or an operator ID.

In using the "Enter User ID" screen 30b shown in FIG. 4B, the user enters a numerical ID via the on-screen keypad

112. The keypad entries are echoed on a small numerical display above the keypad 114. The "Backspace" button 116 is used to correct errors in entering the ID number. The "Enter" button 118 is pressed once the user has completed entering the ID number. At any time, the user may cancel the sign-on process by pressing the "Cancel" button 120. The time and date are displayed in a box 122 appearing in the lower left corner of the screen.

In using the "Enter Password" screen 30c shown in FIG. 4C, the user enters a numeric password via the on-screen keypad 124. The password is masked on the numerical display 126, using asterisks, as it is being entered on the keypad 124. The "Backspace" button 128 is used to correct errors, and the "Enter" button 130 is pressed once the user has completed entry of the password. Touching the "Cancel" button 132 aborts the login and returns the user to the main screen 30a shown in FIG. 4A. The time and date are displayed in a box 134 in the lower left corner of the screen.

Figure 4D:
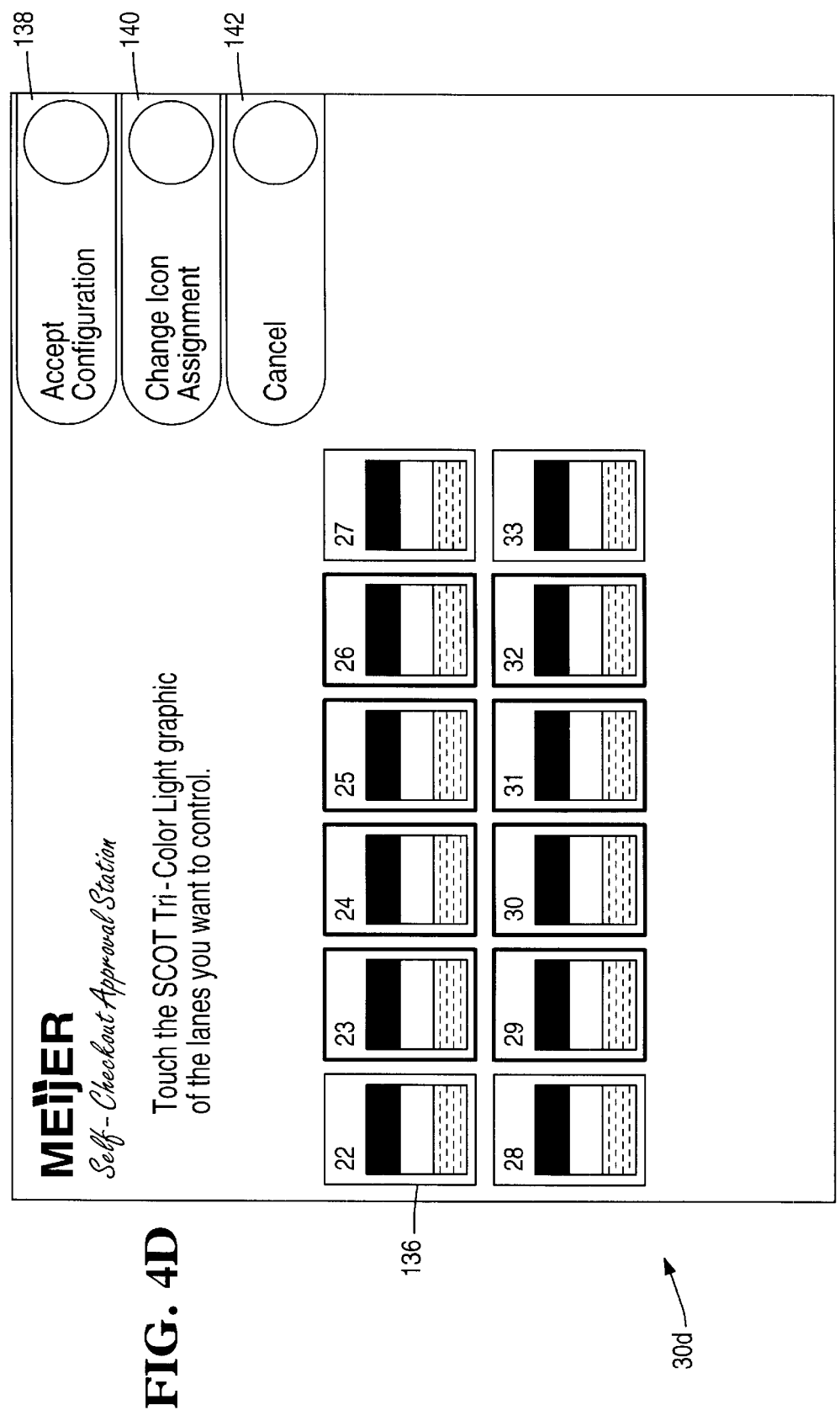

FIG. 4D shows a screenshot of the "Arrange Lanes" screen 30d according to the present invention. This screen is accessed by touching the appropriate button on the main screen 28a shown in FIG. 4A. The "Arrange Lanes" screen 30d contains icons 136 for all of the possible self-checkout lanes supported by the system. The maximum number of lanes in the present embodiment is 12. However, if the store has only eight self-checkout lanes, then the screen would be configured at installation to show only eight icons.

The lane number is depicted in the upper left corner of each graphic 136. This number is customizable but is limited to three digits. Self-checkout lanes that are being monitored by the RAP program are highlighted in white. Self-checkout lanes that are not being monitored are gray.

The user can activate or deactivate any self-checkout lane by touching the corresponding graphic. When the user touches the "Accept Configuration" button 138, the RAP program accepts the changes and assumes control of all of the highlighted self-checkout lanes and returns to the RAP main screen 30a shown in FIG. 4A. Lanes that are not under the control of the RAP program will no longer appear on the RAP main screen 30a.

Touching the "Change Icon Assignment" button 140 takes the user to the "Change Icon Assignment" screen discussed below, wherein the user is permitted to assign icon positions to actual self-checkout lanes.

Touching the "Cancel" button 142 results in losing any modifications and returning to the RAP main screen.

Figure 4E:
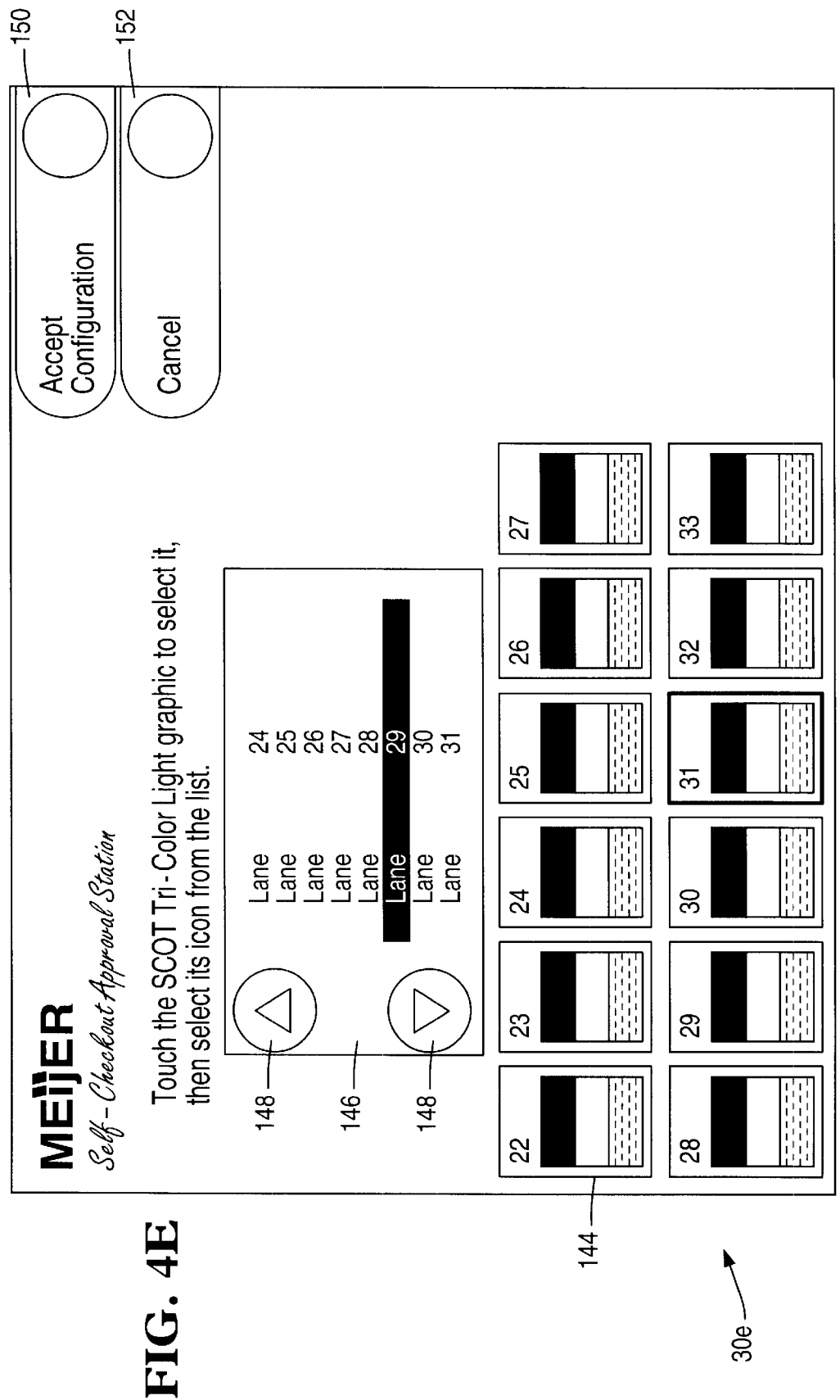

FIG. 4E shows a screenshot of the "Change Icon Assignment" screen 30e. The screen contains icons 144 for 12 possible self-checkout terminal locations. The current lane number assignment is depicted in the upper left corner of the graphic 144. If no lane is assigned to the position, the lane number is left blank.

The upper portion of the "Change Icon Assignment" screen 30e includes a block 146 that displays a listing of the lane identifiers that were set up when the self-checkout terminal network was installed. Numeric identifiers are used, up to three digits. The list is in the format "Lane: ###," where ### is the lane identifier. The list is sorted by lane number, in ascending order. "None" is also an option on this list, and would appear in the first position.

The user selects an icon position by touching the icon 144. The current assignment for this icon position is highlighted in the list 146. The user can use the scroll buttons 148 to move the cursor to another lane identifier. The lane identifier on the icon will also change as the user scrolls through the list.

When the user touches the "Accept Configuration" button 150, the RAP program accepts the new icon assignments and return to the RAP main screen 30a. If a lane identifier has been assigned to more than one lane position, an error message is presented before returning the user to the "Change Icon Assignment" screen 30e. Touching the "Cancel" button 152 will take the user back to the "Arrange Lanes" screen 30d shown in FIG. 4D.

Figure 4F:
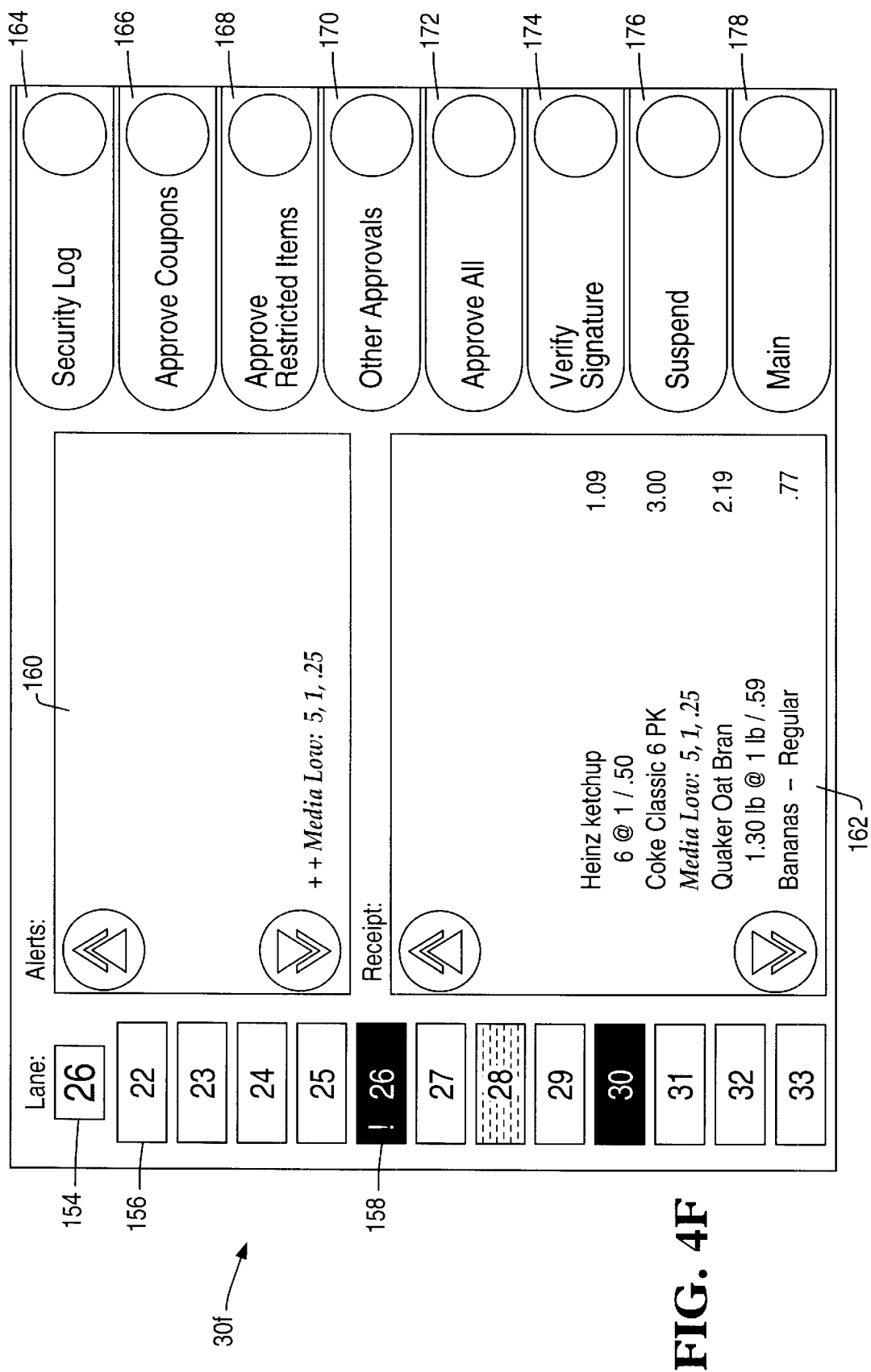

FIG. 4F shows a screenshot of a "Lane Detail" screen 30f used in the presently preferred embodiment of the invention. This screen is accessed by touching any one of the self-checkout terminal icons on the main screen 30a shown in FIG. 4A, and provides the user with greater detail concerning activities at that self-checkout terminal. As shown in FIG. 4F, the lane number of the current lane being monitored is displayed in a box 154 in the upper left corner.

Touchable lane buttons 156 appear on the left side of the screen 28f. The status of the lanes is indicated by color, following the tri-color scheme described above. An open lane is depicted as dark green or, alternatively, the screen's background color. The lane number appears in each button/icon. This number is the same number that is displayed on the RAP program's main screen 30a. The red light lane with the highest priority is depicted graphically using a white exclamation point 158. Touching any of the lane buttons 156 takes the user to the "Lane Detail" screen for that particular lane. Audio feedback is played when a lane changes to red light status. If desired, the audio feedback feature can be disabled by the user.

As shown in FIG. 4F, the "Lane Detail" screen includes a top list 160 and a bottom list 162. Alert messages (i.e., messages for which there is no response available to the user of the self-checkout terminal) are displayed in the top list 160. The list is scrollable. Alert messages are displayed in a configurable color and font. Alert messages, including gated suspends/coupons, for which the system is waiting for a response are depicted by a color/font/symbol (for example, "++" in the above alert.) For alert messages that are longer than one line, the second line and any further lines are indented.

The bottom list 162 is a real-time log receipt that contains the items and coupons scanned/entered, voids, as well as any self-checkout system messages, including alerts, restricted items, recalled items, not-on-file, and the like. For receipt items or messages that are longer than one line, the second line and any additional lines are indented.

The "Security Log" button 164 becomes active when security events require approval. Touching the "Security Log" button 164 takes the user to the "Approve Security" screen, described below. This button is disabled when no security events require approval.

The "Approve Coupons" button 166 becomes active when coupon events require approval. Touching the "Approve Coupons" button 166 takes the user to the "Approve Coupons" screen, described below. The button is disabled when no coupon events require approval. If the customer is at a "Wait for Approval" for dropping off coupons, the "Approve Coupons" button 166 will change to "Coupon Drop-off."

The "Approve Restricted Items" button 168 becomes active when restricted items require approval. Touching the "Approve Restricted Items" button 168 takes the user to the "Approve Restricted Items" screen, described below. The button is disabled when no restricted items require approval.

The "Other Approvals" button 170 becomes active when other approvals are required. Touching the "Other Approvals" button 170 takes the user to the "Other Approvals" screen, described below. The button is disabled when no other approvals require approval.

The "Approve All" button 172 becomes active when any event requires approval. Touching the "Approve All" button 172 results in all approvals being cleared. The button is disabled when there are no approvals.

The "Verify Signature" button 174 becomes active when it is necessary to verify a signature. Touching the "Verify Signature" button 174 takes the user to the "Signature Approval" screen, described below.

Touching the "Suspend" button 176 sends a call to suspend the self-checkout terminal transaction. The self-checkout transaction will not be suspended until it gets to a "Wait for Approval" screen, in which case the RAP program 28 will be sent a message requesting permission to allow the customer to come to the pay station. If the customer is at "Wait for Approval" for a requested suspend, the "Suspend" button will change to "Allow Suspend."

Touching the "Main" button 178 takes the user back to the RAP program's main screen.

Figure 4G:
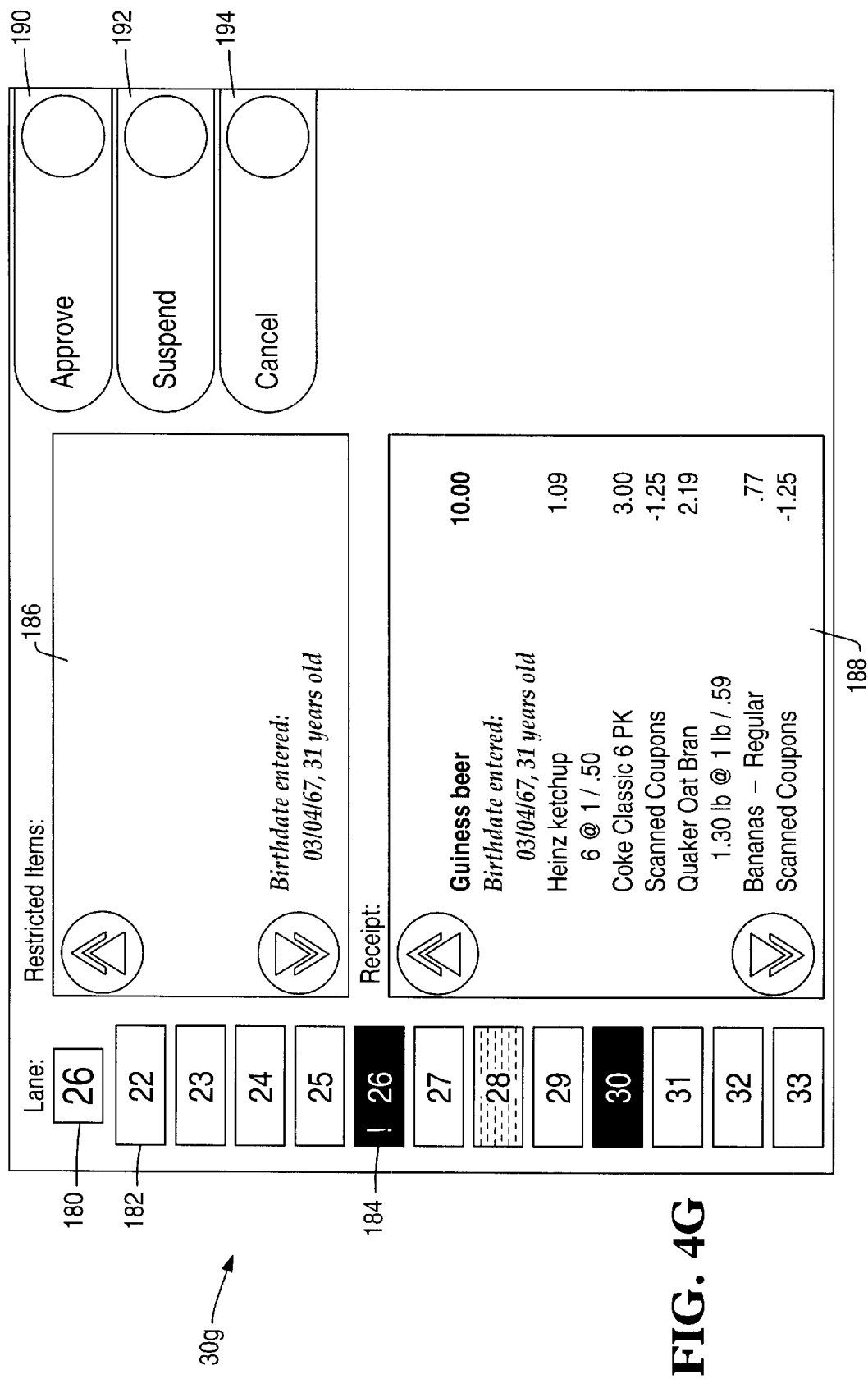

FIG. 4G shows a screenshot of an "Approve Restricted Items" screen 30g. The lane number of the current lane being monitored is displayed in a block 180 in the upper left corner. Touchable lane buttons 182 appear on the left side of the display. Status of the lanes is indicated by color, following the tri-color scheme described above. An open lane is depicted as dark green or, alternatively, the screen's background color. The lane number appears in the button/icon 182. This number is the same number that is displayed on the RAP main screen 28a. The red light lane with the highest priority is depicted graphically using a white exclamation point 184. Touching any of the lane buttons takes the user to the "Lane Detail" screen for that particular lane. Audio feedback is provided when a lane changes to red light status. This feedback can be disabled by the user, if desired.

The "Approve Restricted Items" screen 30g includes a top list 186 and a bottom list 188. The bottom list 188 is a real-time log receipt that contains the items and coupons scanned/entered, voids, as well any self-checkout terminal system messages (alerts, restricted items, recalled items, not-on-file, etc.). For messages that are longer than one line, the second line and above are indented. The birth date that was entered by the user and calculated age (e.g., 3/4/67; 31 years) is displayed in the top list 186 using a color/font which is configurable. Again, for messages that are longer than one line, the second line and above are indented. Touching the "Approve" button 190 clears the exception and allows the user to proceed with restricted item purchases. Touching the "Cancel" button 194 returns the user to the "Lane Detail" display for the current lane. Touching the "Suspend" button 192 sends a call to suspend the transaction at the self-checkout terminal. The self-checkout terminal transaction is not suspended until it gets to a "Wait for Approval" screen, in which case the RAP program is sent a message requesting permission to allow the customer to come to the pay station.

Figure 4H:
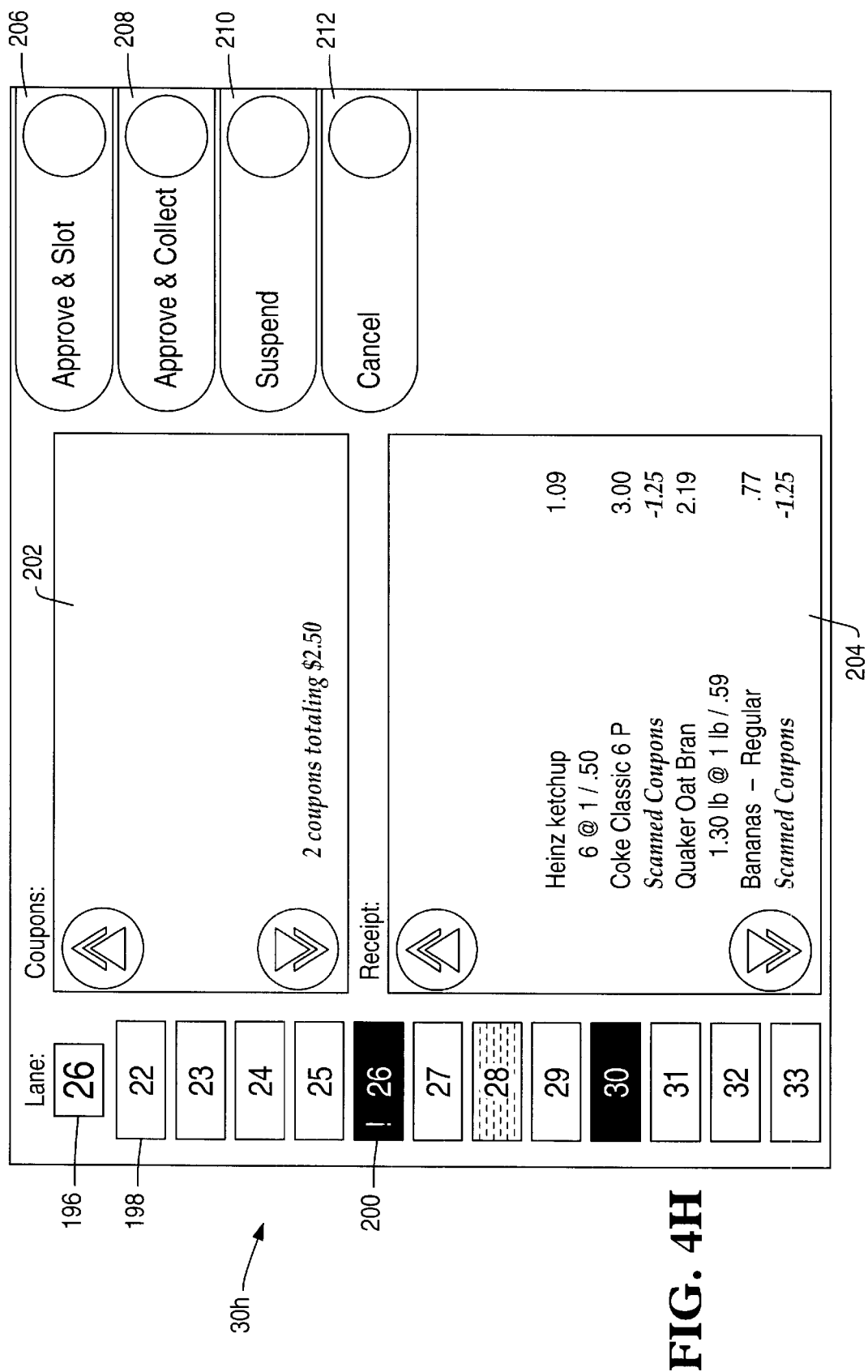

FIG. 4H shows a screenshot of an "Approve Coupons" screen 30h according to the present embodiment of the invention. The lane number of the current lane being monitored is displayed in a block 196 in the upper left corner. Touchable lane buttons 198 appear on the left side of the display. The status of the lanes is indicated by color, following the tri-color scheme described above. An open lane is depicted as dark green or, alternatively, the screen's background color. The lane number appears in the button/icon 198. This number is the same number that is displayed on the RAP program's main screen 30a. The red light lane with the highest priority is depicted graphically using a white exclamation point 200. Touching the lane buttons takes the user to the "Lane Detail" screen for that particular lane. Audio feedback is played when a lane changes to red light status. This feedback can be disabled by the user, as desired.

The "Approve Coupons" screen 30h includes a top list 202 and a bottom list 204. The bottom list 204 is a real-time log receipt, which contains the items and coupons scanned/entered, voids, as well any self-checkout terminal system messages (alerts, restricted items, recalled items, not-on-file, etc.). For messages that are longer than one line, the second line and any additional lines will be indented. If coupon events were previously approved, but subsequent events require another approval, all coupon events are approved. Thus, all coupon events are highlighted by being displayed in a configurable color and font.

The top list 202 contains coupon information in summary form (e.g., 4 coupons totaling $5.50) using a configurable color and font. For messages that are longer than one line, the second line and any additional lines are indented. If coupon events were previously approved, but subsequent events require another approval, the coupon summary reflects all coupon events/information.

Touching the "Approve & Slot" button 206 clears the exception and prompts the user to deposit coupons at the self-checkout terminal. Touching the "Approve & Collect" button 208 clears the exception and prompts the user to deposit coupons at the end of the transaction. The RAP program still needs need to approve that the customer will approach the self-checkout terminal with coupons. Touching the "Cancel" button 212 returns the user to the "Lane Detail" display for the current lane. Touching the "Suspend" button 210 sends a call to suspend the transaction at the self-checkout terminal. The self-checkout terminal transaction will not suspend until it gets to a "Wait for Approval" screen, in which case the RAP program will be sent a message requesting permission to allow the customer to come to the pay station.

Figure 4I:
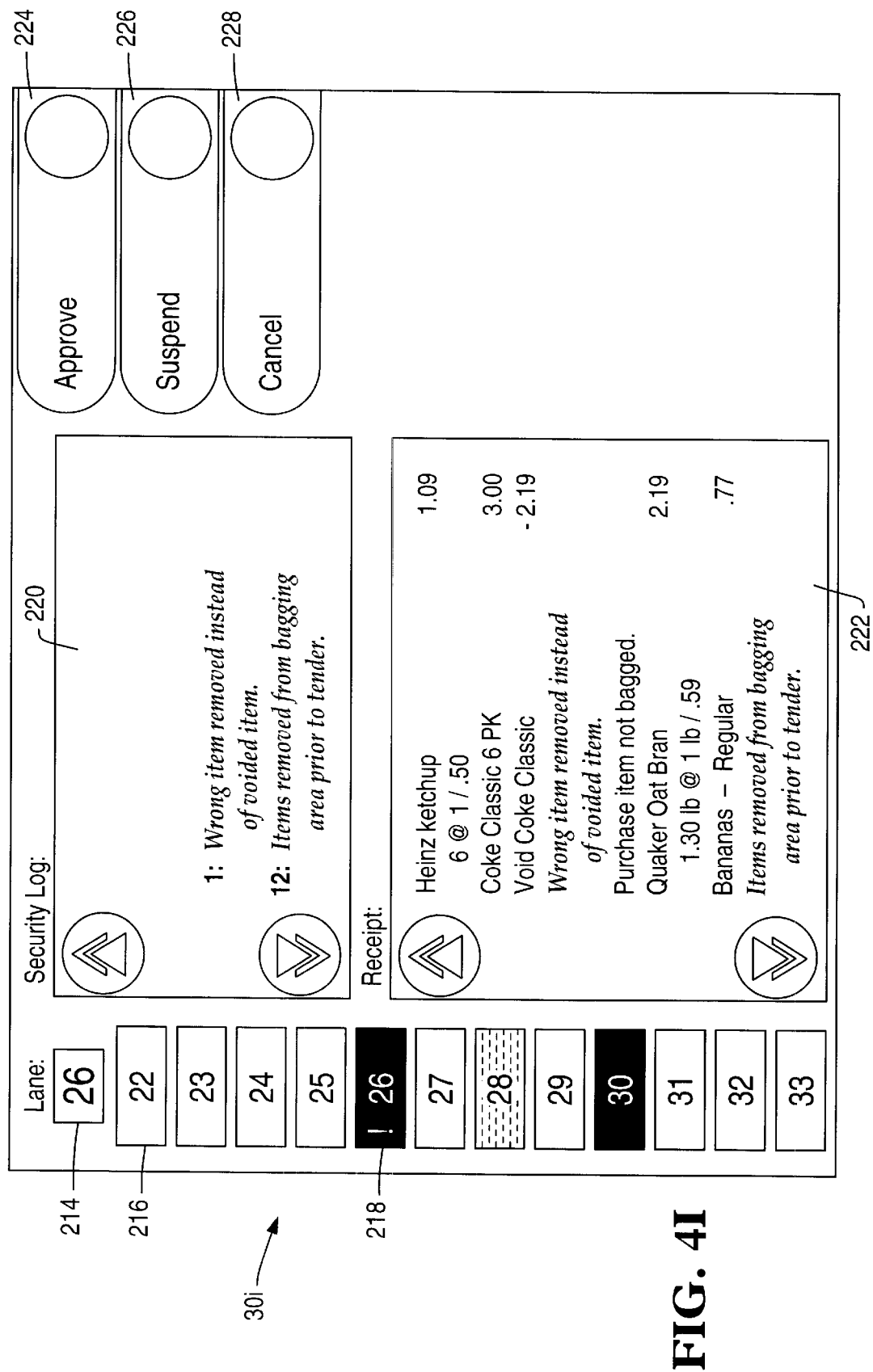

FIG. 4I is a screenshot of an "Approve Security" screen 30i according to the present embodiment of the invention. The lane number of the current lane being monitored is displayed in a block 214 in the upper left corner of the screen. Touchable lane buttons 216 appear on the left side of the display. The status of the lanes is indicated by color, which follows the above-described tri-color scheme. An open lane is depicted as dark green or, alternatively, the screen's background color. The lane number appears in the button/icon 216. This number is the same number that is displayed on the RAP program's main screen 30a. The red light lane with the highest priority is depicted graphically using a white exclamation point 218. Touching the lane buttons takes the user to the "Lane Detail" screen for that particular lane. Audio feedback is provided when a lane changes to red light status. This audio feedback can be disabled by the user, if desired.

The "Approve Security" screen includes a top list 220 and a bottom list 222. The bottom list 222 is a real-time log receipt which contains the items and coupons scanned/entered, voids, as well any self-checkout system messages (alerts, restricted items, recalled items, not-on-file, etc.). For messages that are longer than one line, the second line and any additional lines are indented. If security events were previously approved, but subsequent security events require another approval, all security events, including those that were previously approved and those currently requiring approval, are approved by pressing the "Approve" button 224. All security events are highlighted by displaying them in a configurable color and font.

The top list 220 contains security information in summary form (for example, 2 unpurchased items placed in bagging area) using a color/font which is configurable. For messages that are longer than one line, the second line and above are indented. If security events have been previously approved, but subsequent events require another approval, the security summary reflects all security events/information.

Touching the "Approve" button 224 clears the exception and allow the user to proceed with restricted item purchases. Touching the "Cancel" button 228 returns the user to the "Lane Detail" display for the current lane. Touching the "Suspend" button 226 will send a call to suspend the transaction at the self-checkout terminal. The self-checkout terminal transaction is not suspended until it gets to a "Wait for Approval" screen. In that case, the RAP program is sent a message requesting permission to allow the customer to come to the pay station.

Figure 4J:
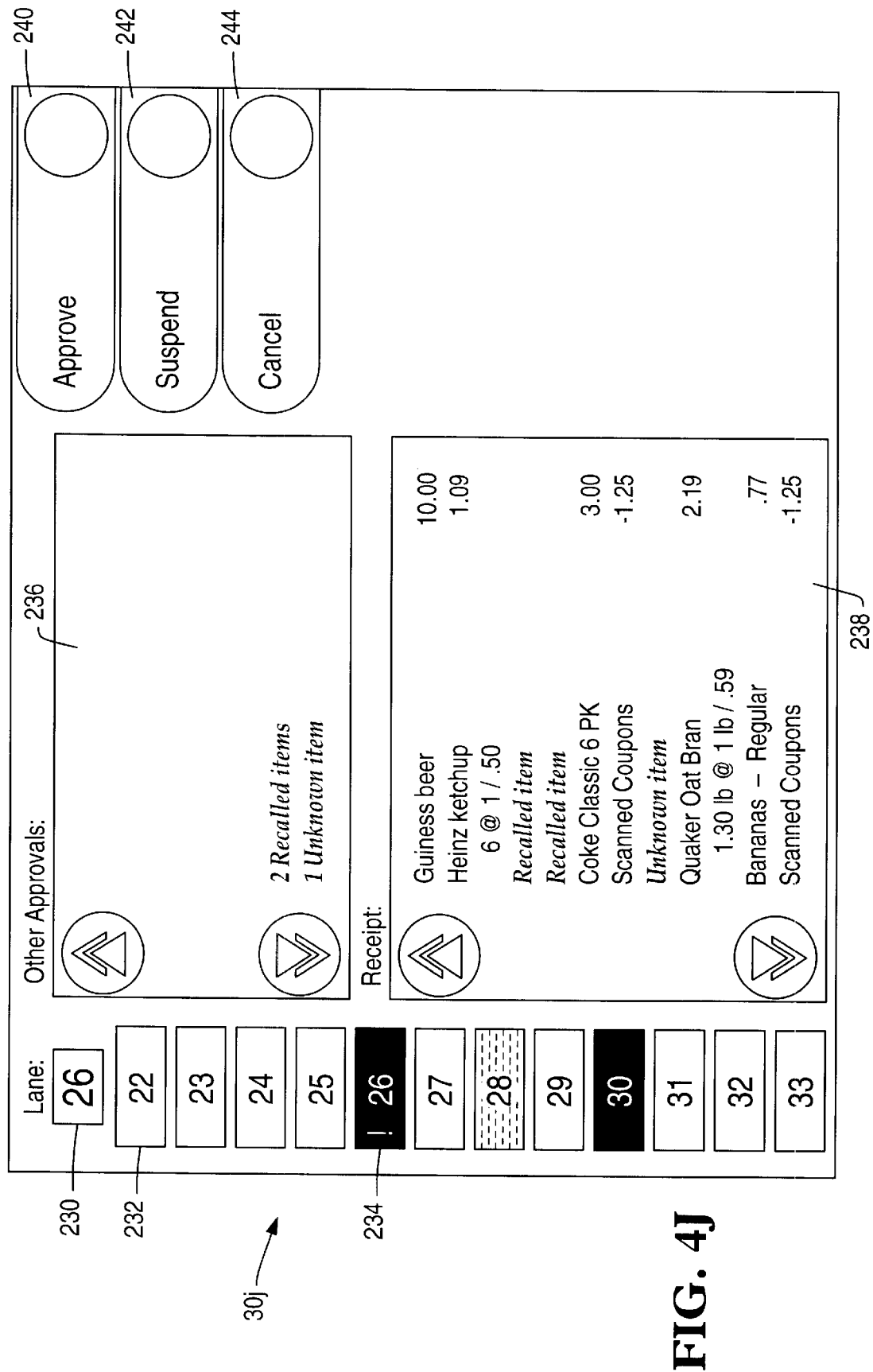

FIG. 4J shows a screenshot of an "Other Approvals" screen 30j according to the present embodiment of the invention. The lane number of the current lane being monitored is displayed in a block 230 in the upper left corner of the screen. Touchable lane buttons 232 appear on the left side of the display. The status of the lanes is indicated by color, following the tri-color scheme described above. An open lane is depicted as dark green or, alternatively, the screen's background color. The lane number appears in the button/icon 232. This number is the same number that is displayed on the RAP program's main screen 30a. The red light lane with the highest priority is depicted graphically using a white exclamation point 234. Touching the lane buttons 230 takes the user to the Lane Detail Display for that particular lane. Audio feedback is played when a lane changes to red light status. This feedback can be turned off.

The "Other Approvals" screen 30j includes a top list 236 and a bottom list 238. The bottom list 238 is a real-time log receipt that contains the items and coupons scanned/entered, voids, as well any self-checkout system messages (alerts, restricted items, recalled items, not-on-file, etc.). For messages that are longer than one line, the second line and any additional lines are indented. If events have been previously approved, but subsequent events require another approval, all "other approval" events will be approved. All "other approval" events are highlighted by displaying them in a configurable color and font.

The top list 236 contains approval information in summary form (e.g., two recalled items) using a color/font which is configurable. For messages that are longer than one line, the second line and any subsequent lines are indented. If events have been previously approved, but subsequent events require another approval, the "other approval" summary reflects all "other approval" events/information.

Touching the "Approve" button 240 clears the exception and allows the user to proceed with restricted item purchases. Touching the "Cancel" button 244 returns the user to the "Lane Detail" display for the current lane. Touching the "Suspend" button 242 sends a call to suspend the transaction at self-checkout terminal. The self-checkout terminal transaction will not suspend until it gets to a "Wait for Approval" screen. In that case, the RAP program will be sent a message requesting permission to allow the customer to come to the pay station.

Figure 4K:
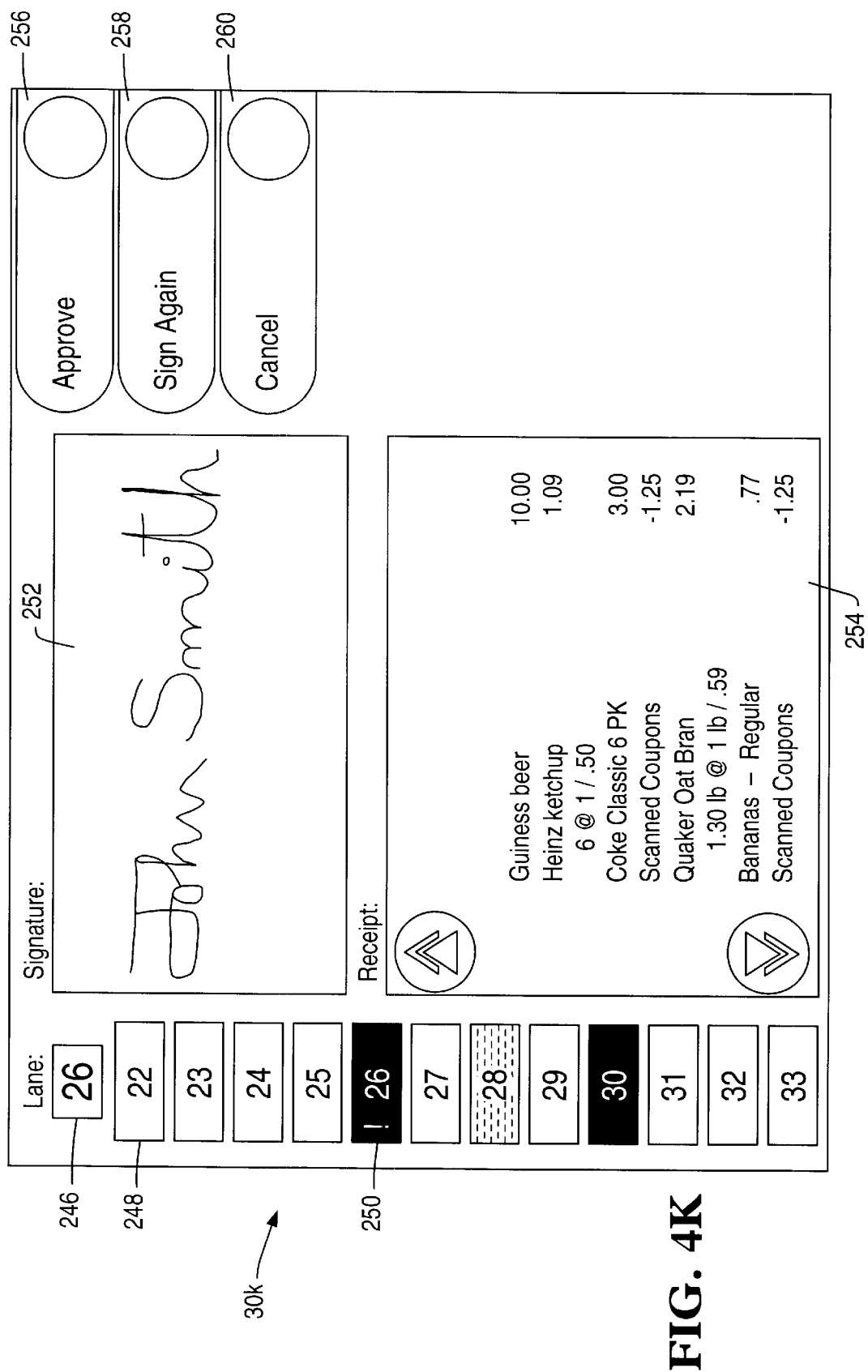

FIG. 4K shows a screenshot of a "Signature Approval" screen 30k according to the present embodiment of the invention. The lane number of the current lane being monitored is displayed in a block 246 in the upper left corner of the screen. Touchable lane buttons 248 appear on the left side of the display. The status of the lanes is indicated by color, following the above-described tri-color scheme. An open lane is depicted as dark green or, alternatively, the screens background color. The lane number appears in the button/icon 248. This number is the same number that is displayed on the RAP program's main screen 30a. The red light lane with the highest priority is depicted graphically using a white exclamation point 250. Touching the lane buttons 248 takes the user to the "Lane Detail" display for that particular lane. Audio feedback is provided when a lane changes to red light status. This audio feedback can be disabled by the user, if desired.

The "Signature Approval" screen 30k includes a top display block 252 and a bottom list 254. The bottom list 254 is a real-time log receipt which will contain the items and coupons scanned/entered, voids, as well any self-checkout terminal system messages (alerts, restricted items, recalled items, not-on-file, etc.). For messages that are longer than one line, the second line and above are indented. The signature is displayed in the top display block 252.

Touching the "Approve" button 256 will clear the exception and allow the user to proceed with the transaction. Touching the "Cancel" button 260 returns the user to the "Lane Detail" display for the current lane. Touching the "Sign Again" button 258 will clear the exception and send a call to the self-checkout terminal to collect the signature from the customer again. After the customer signs the signature capture device at the self-checkout terminal, the RAP program is sent another red-light alert.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A system for processing retail transactions, comprising:
   a network of self-checkout terminals at which retail customers perform self-checkout activities, each self-checkout terminal monitoring the self-checkout activities performed at that terminal to determine whether an issue has arisen requiring intervention by store personnel and placing each such detected issue into an issues log;
   a remote authorization station connected into the network, the remote authorization station accessing the issues log to review and resolve the issues that have arisen in priority order.

2. The system of claim 1, wherein issues arising at a self-checkout terminal are resolved at the remote authorization station in parallel with the customer's processing of additional transactions at the self-checkout terminal.

3. The system of claim 1, wherein the remote authorization station includes a display for displaying a list of issues that have arisen at self-checkout terminals.

4. The system of claim 3, wherein the display includes a graphical representation for each of the self-checkout terminals connected into the network.

5. The system of claim 4, wherein the graphical representation for each of the self-checkout terminals includes a graphical indication showing whether an issue has arisen at that terminal, the graphical indication including a numerical indication of the priority of any issues that have arisen.

6. The system of claim 3, wherein the display is a touchscreen display having touchscreen buttons that are used by store personnel to resolve issues that have arisen at self-checkout terminals.

7. The system of claim 1, wherein issues arising at a self-checkout terminal are resolved at the remote authorization station in parallel with the retail customer continuing to perform self-checkout activities at that self-checkout terminal.

8. The system of claim 7, wherein the remote authorization station and the self-checkout terminal share data using an interprocess communication mechanism.

9. The system of claim 1, wherein the self-checkout terminals suspend a transaction when an issue arises in that transaction that cannot be resolved at that self-checkout terminal.

10. The system of claim 9, wherein, when a transaction has been suspended at a self-checkout terminal, the self-checkout terminal then becomes free for use by another retail customer.

11. The system of claim 10, further including:
   a personnel-operated checkout terminal for continuing transactions that have been suspended at a self-checkout terminal.

12. The system of claim 11, wherein the self-checkout terminal includes a printer for printing a bar-coded receipt when a transaction has been suspended at that self-checkout terminal.

13. The system of claim 12, wherein the personnel-operated checkout terminal includes a scanner for scanning the bar-coded receipt printed by the self-checkout terminal.

14. The system of claim 13, wherein the personnel-operated checkout terminal resumes the suspended transaction upon scanning the bar-coded receipt.

15. A method for resolving issues arising in a network of self-checkout terminals, comprising the following steps:

(a) monitoring customer activity taking place at the self-checkout terminals;

(b) determining whether any issues have arisen at any of the self-checkout terminals requiring intervention by store personnel;

(c) storing any issues that have arisen in an issues log;

(d) determining whether the transaction is done at a self-checkout terminal and whether any issues have arisen to be resolved at a remote authorization station; and (e) if it is determined that the transaction is done at that self-checkout terminal and that there are issues to be resolved at the remote authorization station, accessing the issues log at the remote authorization station to resolve the issues remotely.

16. The method of claim 15, wherein step (c) includes prioritizing the issues stored in the issues log and wherein in step (e), the issues are resolved at the remote authorization station in priority order.

17. The method of claim 15, further including the following steps performed after step (e):

(f) suspending the transaction at the self-checkout terminal if it is determined that an issue has arisen that cannot be resolved at the remote authorization station; and (g) continuing the transaction at a personnel-operated checkout terminal.

18. The method of claim 17, wherein step (f) includes printing a bar-coded receipt after the transaction has been suspended, and step (g) includes scanning the bar-coded receipt to continue the transaction at the personnel-operated checkout terminal.

* * * * *